UNITED STATES PATENT OFFICE.

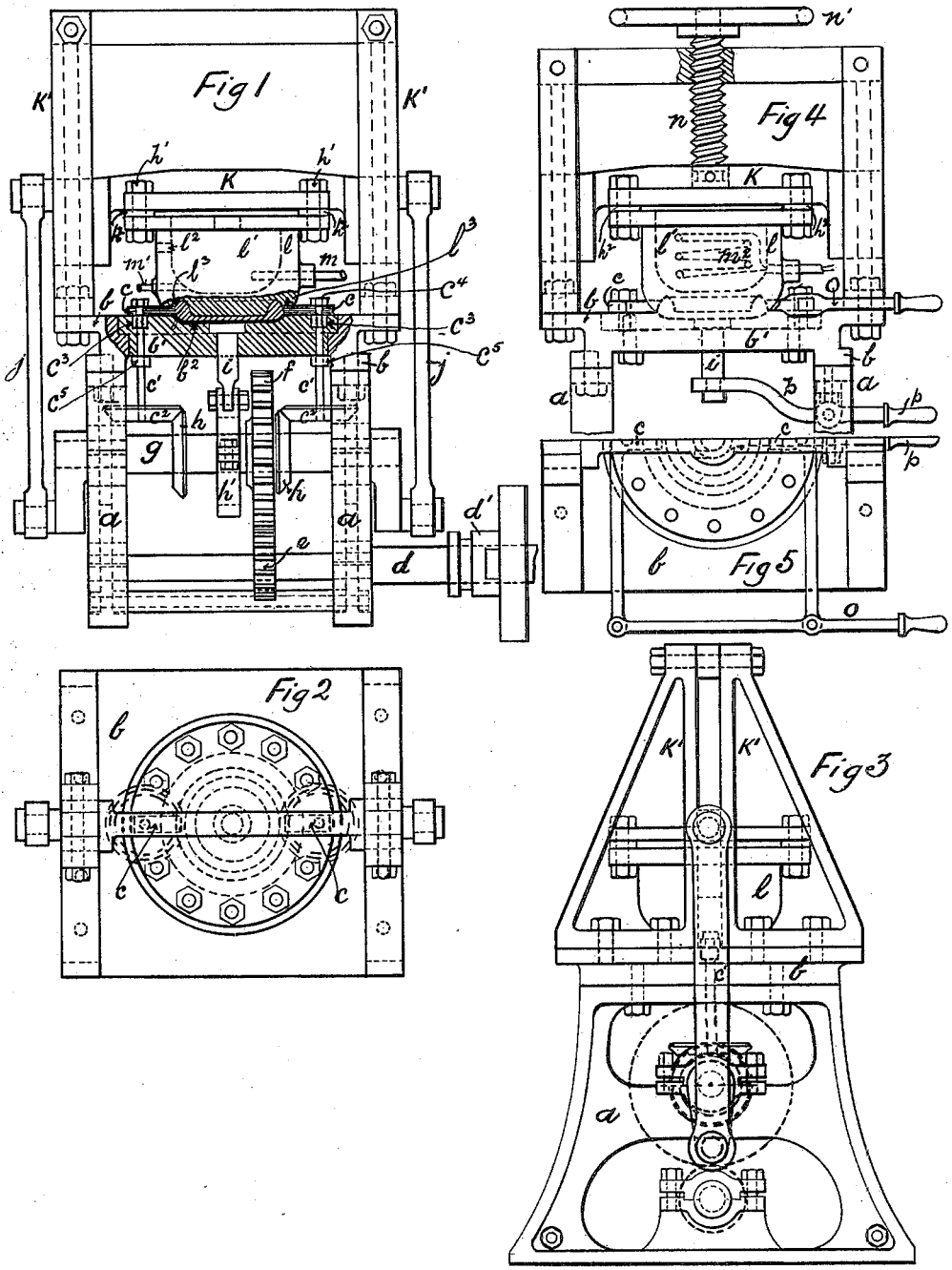

JAMES HUGHES, OF JERSEY CITY, NEW JERSEY.

PIE RAISING, TRIMMING, AND LIDDING MACHINE.

SPECIFICATION forming part of Letters Patent No. 622,478, dated April 4, 1899.

Application filed December 22, 1897. Serial No. 663,007. (No model.)

*To all whom it may concern:*

Be it known that I, JAMES HUGHES, a citizen of the United States, and a resident of Jersey City, in the county of Hudson and State of New Jersey, have invented certain new and useful Improvements in Pie Raising, Trimming, and Lidding Machines, of which the following is a specification.

This invention relates to certain new and useful improvements in pie raising, trimming, and lidding machines, and has for its object the production of such a machine which will enable pie-crusts to be expeditiously molded to an even thickness and trimmed and which will be economical in construction and not liable to derangement of its parts.

To these ends, therefore, my said invention consists in the novel mechanism, the details of construction, and the arrangement and combination of parts, all as hereinafter more fully described, and pointed out in the claims.

In the accompanying drawings, in the several views of which like parts are designated by similar letters of reference, Figure 1 is an elevation, partly in section. Fig. 2 is a top plan view. Fig. 3 is a side elevation. Fig. 4 is a partial elevation of a modification of my invention. Fig. 5 is a partial plan view of Fig. 4.

$a$ is a frame on which is mounted the bed-plate or table $b$, and secured thereto is the lower mold $b'$, centrally recessed or hollowed out to receive a pie-plate $b^2$, the edges of which project above said mold and are temporarily engaged by the diametric horizontal lugs or fingers $c$, mounted eccentrically upon the vertical spindles $c'$, passing through the lower mold $b'$ and terminating in bevel-gears $c^2$. In place of the fingers $c$ eccentric-disks may be used, if desired. The spindles $c'$ are enlarged at their upper end, as $c^3$, to form a bearing and to allow being tapped for the bolts $c^4$, which hold the fingers in place. Collars $c^5$ are fastened to the spindles to preserve the proper meshing of the bevel-wheels $c^2$ and $h$.

A shaft $d$ is mounted in frame $a$ and is thrown into and out of gear with a suitable source of power by any appropriate means, a jaw-clutch $d'$ being here shown. Said shaft carries the pinion $e$, meshing with and adapted to rotate the spur-gear $f$, keyed upon the double-crank shaft $g$, which is also journaled in the frame $a$. Keyed to crank-shaft $g$ are the bevel-gears $h$, meshing with the gears $c^2$ and the eccentric $h'$, the former being adapted to operate the fingers or pie-plate holders $c$ and the latter being pivoted to and adapted to operate the reciprocating headed pin $i$, passing centrally through the lower mold $b'$ and normally forming part of the recess of the lower mold.

Connecting-rods $j$ extend between the crank of shaft $g$ and a cross-head $k$, which works in guides $k'$, secured above the frame $a$. Said cross-head carries the pie raiser, trimmer, or lidder proper, the same comprising a hollow plunger $l$, the lower face of which is appropriately shaped to mold the dough around the bottom and sides of the plate and to trim the dough off at the edges of the plate or to lid and trim the pie, the former construction being here shown. The inner chamber $l'$ of the hollow plunger $l$ is preferably heated to prevent the dough from clinging to the plunger, and this may be accomplished by inserting inlet and outlet pipes $m\ m'$ in said chamber and circulating steam therethrough by a flexible hose connected to the inlet and outlet, or a gas-jet may be inserted in the opening, or, as in Fig. 4, an electric coil $m^2$ may be used, as preferred. When gas is used, suitable openings are made in the hollow plunger $l$ to supply air, as shown at $l^2$. The plunger $l$ is cut away at $l^3$ to allow the fingers $c$ or other clamping device to operate. By bolting the plunger $l$ to the cross-head $k$ with bolts $h'$ and interposing washers $h^2$ between the plunger and cross-head the thickness of the pie-crust may be accurately adjusted.

In operation a pie-plate containing dough is placed in the recess of the lower mold $b'$, and the machine is started by throwing into gear the clutch $d'$ or other device. The eccentric fingers or plate-holders $c$ are then moved through the mechanism described to engage the edge of the plate, and the plunger $l$ descends and raises and trims or lids and trims the pie. When this operation is completed and the plunger $l$ has moved upwardly a short distance, the fingers $c$ are revolved out of contact with the pie-plate, and the eccentric $h'$ raises the headed pin $i$ and lifts the plate and dough out of the recess in lower mold $b'$, ready for removal.

The modification shown in Figs. 4 and 5 consists in a machine designed to be operated by hand and without power. In this construction the plunger $l$ is operated by the screw $n$ and hand-wheel $n'$. The plate-holders $c$ are angle-shaped levers and operated by the lever $o$. The lifting-pin $i$ is raised and lowered through lever $p$.

It will be noticed that the lower mold $b'$ is essentially a ring made of a continuous piece of material, without any hinges to open, to eject the pie-plate after the pie has been raised, trimmed, or lidded.

I do not wish to limit or confine myself to the details of construction as herein shown and described, as obviously many changes and alterations may be made therein without departing from the principle and scope of my invention.

What I claim as new, and desire to secure by Letters Patent, is—

1. A solid ring-shaped lower mold, adapted to receive a pie-plate, in combination with holding devices for said plate, and a reciprocating hollow plunger, actuated with a cross-head, and guides, substantially as described.

2. A solid ring-shaped lower mold, adapted to receive a pie-plate, in combination with a hollow heated reciprocating plunger operating with a cross-head and guides, and means for lifting said plate out of said recess, substantially as described.

3. A solid ring-shaped lower mold, adapted to receive a pie-plate, a reciprocating hollow heated plunger operating with a cross-head and guides, in combination with simultaneously-actuated holding devices for said plate, substantially as described.

4. A hollow solid ring-shaped lower mold, adapted to receive a pie-plate, a reciprocating hollow gas-heated plunger, adapted to operate with cross-head and guides, eccentric disks or fingers adapted to be moved simultaneously into and out of engagement with the plate, a pin normally forming part of the bottom of the recess in the said mold, and means for raising said pin above said bottom to eject the plate substantially as described.

5. A recessed or hollow mold adapted to receive a plate in combination with a reciprocating plunger working in guides; eccentric fingers or disks mounted on spindles having beveled gears; a headed pin normally forming a part of the bottom of the recess or hollow in the mold; a crank-shaft having beveled gears meshing with the gears on the spindles; connecting-rods adapted to operate the plunger; an eccentric, adapted to raise and lower said pin, and means for rotating said shaft, substantially as described.

6. In a pie raising, trimming and lidding machine, a frame carrying a table with a mold; an ejecting-pin for said mold operated by an eccentric; spindles with disks or fingers and beveled gears, driven by gears mounted on a double-crank shaft; a hollow heated plunger bolted to a cross-head and operating with guides, and connecting-rods from said cross-head to double-crank shaft; a driving-shaft with a spur-gear meshing with spur-gear keyed on double-crank shaft; a clutch controlling operations of driving-shaft, all as substantially described.

Signed at Jersey City, in the county of Hudson and State of New Jersey, this 2d day of December, A. D. 1897.

JAMES HUGHES.

Witnesses:
FREDERIC S. WADSWORTH,
DANIEL J. GRIFFIN.